US007119928B2

(12) United States Patent
Harrington

(10) Patent No.: US 7,119,928 B2
(45) Date of Patent: Oct. 10, 2006

(54) SYSTEMS AND METHODS FOR GENERATING THRESHOLD ARRAY HALFTONE IMAGES WITH PARTIAL PIXEL POSITION RESOLUTION

(75) Inventor: Steven J. Harrington, Webster, NY (US)

(73) Assignee: Xerox Corporation, Stamford, CT (US)

(*) Notice: Subject to any disclaimer, the term of this patent is extended or adjusted under 35 U.S.C. 154(b) by 1054 days.

(21) Appl. No.: 10/046,146

(22) Filed: Jan. 16, 2002

(65) Prior Publication Data
US 2003/0133161 A1 Jul. 17, 2003

(51) Int. Cl.
H04N 1/405 (2006.01)
(52) U.S. Cl. .................................. 358/3.2; 358/2.1
(58) Field of Classification Search ................ 358/1.9, 358/2.1, 3.09–3.12, 3.2, 3.01; 382/237
See application file for complete search history.

(56) References Cited

U.S. PATENT DOCUMENTS

| 4,537,470 A | | 8/1985 | Schoppmeyer |
| 5,321,525 A | * | 6/1994 | Hains ........................ 358/3.01 |
| 5,410,414 A | | 4/1995 | Curry |
| 5,732,162 A | | 3/1998 | Curry |
| 6,264,298 B1 | * | 7/2001 | Mantell ........................ 347/15 |
| 6,301,397 B1 | * | 10/2001 | Jankowski et al. ........ 382/296 |
| 6,449,396 B1 | * | 9/2002 | Loce et al. ................. 382/276 |

OTHER PUBLICATIONS

T. Holladay, "An Optimal Algorithm for Halftone Generation for Display and Hard Copies," *Proceedings of the Society for Information Display*, vol. 21, No. 2, pp. 185-192, (1980).

* cited by examiner

*Primary Examiner*—Thomas D. Lee
*Assistant Examiner*—Stephen Brinich
(74) *Attorney, Agent, or Firm*—Oliff & Berridge, PLC

(57) ABSTRACT

Systems and methods that shift the halftone screen relative to the image data in the low-addressability direction to compensate for misregistration would be useful. In various exemplary embodiments of the systems and methods of this invention, each pixel of the halftone cell is first divided into high-addressability pixels at the high-addressability factor. The high-addressability factor is the ratio between the base resolution and the high-addressability resolution. The high-addressability pixels are then divided into subrows using the same high-addressability factor. Each high-addressability pixel in each subrow is then assigned its own threshold value. By shifting the threshold values between adjacent subrows based on the subrow, a particular halftone pattern in the low-addressability direction is implemented. Then, by appropriately selecting the particular subrow to select a particular set of threshold values, the halftone screen can be shifted at the high-addressability resolution along the low-addressability direction.

17 Claims, 13 Drawing Sheets

SYSTEMS AND METHODS FOR GENERATING THRESHOLD ARRAY HALFTONE IMAGES WITH PARTIAL PIXEL POSITION RESOLUTION

BACKGROUND OF THE INVENTION

1. Field of Invention

This invention relates to systems and methods for generating binary halftone dots.

2. Description of Related Art

Digital halftoning has evolved as a method of rendering the illusion of continuous tone, or "contone", images using devices that are capable of producing only binary picture elements. Conventional halftoning adds a two-dimensional, spatially-periodic, dot screen or line screen structure to the images to be halftoned. Typically, the same screen, or at least a number of more or less identical screens, are used to halftone each of the color separation layers of a polychromatic, i.e., color, image. The halftone screens are oriented at different angles for printing the respective halftone color separation layers.

Misregistration between the color separation layers in a halftoned color image causes a number of problems, including gaps and overlaps between colors, color shifts and moiré. Ideally, perfect registration should be obtained. However, obtaining perfect registration is usually too difficult and/or too costly to obtain using mechanical systems.

Trapping is commonly used to reduce gaps. Using rotated halftone screens can reduce color shifts and moiré, because such rotated halftone screens are less sensitive to misregistration. However, rotated screens do not provide as large a color gamut or as fine a screen structure as that which can be achieved using a dot-off-dot halftone. Unfortunately, dot-off-dot halftones are extremely sensitive to misregistration.

Recently, systems and methods that shift or warp the image data have been developed to compensate for misregistration. These systems and methods place the image in the correct location and can avoid trapping problems. However, these systems and methods do not shift the halftone and they do not solve color shift problems that can arise from misregistered halftoned color separation layers.

The halftoning methods disclosed in U.S. Pat. No. 5,410,414 to Curry, incorporated herein by reference in its entirety, and U.S. Pat. No. 4,537,470 to Schoppmeyer, warp, i.e., adjust or move, the image data produced by an image data generator to improve registration. Such image data generators include color or gray scale image generators and binary image generators.

In many image-forming devices, a stimulus is scanned relative to the surface on which the image is formed at high rate in one direction, and a lower rate in a generally orthogonal direction. For example, in an image forming device that uses a raster output scanner, such as a laser beam, the beam is scanned across a photoreceptor along a first direction, known as the high-addressability direction, that is generally orthogonal to a process direction in which the image surface moves past the raster output scanner. Subsequent scans of the laser beam are offset from each other in a low-addressability direction that corresponds to the process direction. Thus, the low-addressability direction is generally orthogonal to the high-addressability direction. In contrast, in an image forming device that uses a page-width wide bar of LEDs or laser diodes, the high-addressability and process directions are parallel to each other, while the low-addressability direction is generally orthogonal to both the high-addressability and process directions.

High addressability or hyperacuity refers to the ability to locate an edge, occurring between one portion of an image and another portion of an image, at a resolution that is greater than the resolution of the stimulus used to form the image. Such edges often occur between halftone dots and the non-image background regions of each of the color separation layers. One common stimulus used by various image forming apparatus to form images is the light beam scanned by the raster output scanner (ROS). In various known high-addressability systems, the light beam is modulated at a rate that is four times or eight times the period it takes the raster output scanner to move the one or more light beams a distance along the high-addressability direction that is equal to the diameter of the light beam. This is known as 4× or 8× high addressability.

SUMMARY OF THE INVENTION

Systems and methods that shift the halftone screen or a particular halftone dot relative to the image data in the low-addressability direction to compensate for misregistration in the same way that the 414 and 470 patents shift the image would be useful.

Conventional halftone screens are often defined as an array of threshold values representing a halftone cell, as illustrated in FIG. 1. As shown in FIG. 1, one threshold is defined for each individual one of the set of pixels that together form the halftone cell.

Typically, there is one threshold value per pixel or sub-pixel in the halftone cell. The cell is replicated over the plane of a color separation layer to cover all pixels in the image. In various exemplary embodiments, the cells are rectangular, or at least the cells can be represented as rectangular cells known as Holladay bricks. When Holladay bricks are used to represent halftone cells that are aligned at an angle to the raster grid of other than 0°, ±90° or 180°, the Holladay bricks in one row are offset relative to the Holladay bricks of the adjacent rows along the high-addressability direction of the raster. This is shown in FIG. 2.

As shown in FIG. 3, in systems and methods that define a halftone screen for a high-addressability system, a threshold is specified for each addressable portion of each pixel in the high-addressability direction. Thus, FIG. 3 shows a halftone screen for a system with high addressability in one dimension. However, for practical purposes, the high-resolution pixels should not be treated as completely independent. Rather, the thresholds should be arranged to turn on the high-addressability pixels in blocks. This avoids creating independent and/or small groups of active high-resolution pixels that may not develop and image.

While the thresholds should be arranged to generate blocks of pixels, as shown in FIG. 4, the thresholds in the blocks need not all be the same value. Thus, blocks of different widths can be created. This use of high addressability to create pulses of different widths is one of the main reasons for implementing high addressability. In general, the actual values in the high-resolution cell positions do not matter, so long as the thresholds are assigned at the high-addressability resolution. This makes it straightforward to shift the position of the halftone by the high-addressability amount in the high-addressability direction.

However, this does nothing to provide for a shift of the halftone in the low addressability direction, which is often the slow scan direction.

This invention provides systems and methods that implement a partial bitting pattern in the high-addressability pixels to interpolate between the low addressability rows of high-addressability pixels.

This invention separately provides systems and methods that define the halftone threshold values at the high-addressability resolution in both the high-addressability direction and the low-addressability direction.

This invention separately provides systems and methods that shift the halftone screen or the halftone dots in the low-addressability direction within a row by selecting one of a set of subrows of that row that have threshold values for the high-addressability pixels defined at the high-addressability resolution.

This invention separately provides systems and methods that use, for a given row, a selected one of a set of subrows of that row, where each subrow has the threshold values for the high-addressability pixels of that row defined at the high-addressability resolution.

In various exemplary embodiments of the systems and methods according to this invention, each pixel of the halftone cell is first divided into high-addressability pixels at the high-addressability factor. The high-addressability factor is the ratio between the base resolution and the high-addressability resolution. Each row of high-addressability pixels is then divided into subrows, so that the threshold values are defined at a higher resolution in the low-addressability direction than the base resolution of the low-addressability direction. In various exemplary embodiments, this higher resolution for the low-addressability direction is the same as the high-addressability resolution. That is, in such exemplary embodiments, each row is divided into subrows using the same high-addressability factor.

Each higher-resolution pixel in each subrow is then assigned its own threshold value. By shifting the threshold values between adjacent subrows based on the subrow, a particular halftone pattern in the low-addressability direction is implemented. Then, by appropriately selecting the particular subrow to select a particular set of threshold values, the halftone screen can be shifted at this higher resolution along the low-addressability direction.

These and other features and advantages of this invention are described in, or are apparent from, the following description of the systems and methods according to this invention.

BRIEF DESCRIPTION OF THE DRAWINGS

Various exemplary embodiments of this invention will be described in detail, with reference to the following figures, wherein:

FIG. 4 illustrates a second exemplary embodiment of a halftone cell defined as an array of thresholds assigned to high-addressability pixels, where the threshold generates pulses with modulated widths;

FIG. 6 illustrates one exemplary embodiment of a halftone cell defined as an array of thresholds according to this invention, where each row of the halftone cell is divided into a number of subrows;

DETAILED DESCRIPTION OF EXEMPLARY EMBODIMENTS

Figure 1:
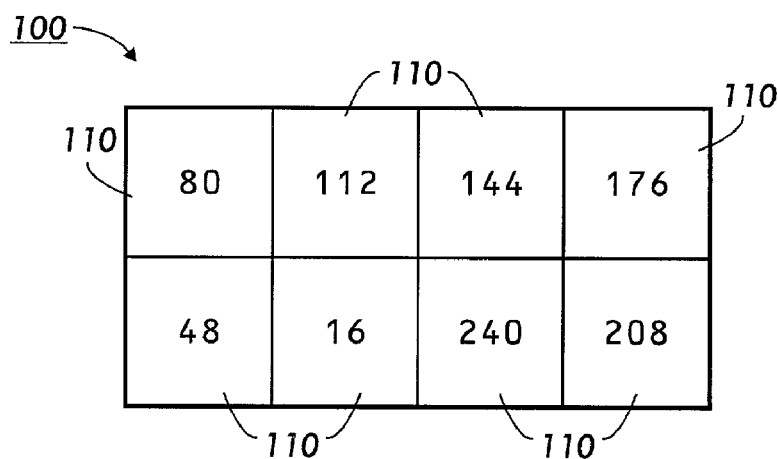
FIG. 1 shows one exemplary embodiment of a halftone cell defined as an array of thresholds.

Digital halftoning can suffer from misregistration between the various color separation layers used in color image, for example, cyan, magenta, yellow and black (CMYK) color separation layers. This misregistration can be caused by misalignment among the various halftone screens and also by misalignment between the halftone screens and an image forming apparatus grid structure, i.e., an output grid structure, used to generate electronic image data from an image, of an image forming member. This misregistration can also include errors in rotation of the screen angle. This misregistration can cause moiré patterns.

Moiré patterns can also be generated based on the screen angles used for each of the color separation layers, even without any misregistration. Regardless of how the moiré patterns are formed, moiré patterns are detrimental to the accurate rendering of the color image. Moiré patterns often arise due to "beating", i.e., periodically mismatching patterns of interference that degrade the resulting rendered images. A halftone screen can beat with the output grid structure, called auto-moiré, or can beat with other halftone screens. When the various color separation layers are combined during rendering of a multicolor image, where each color separation layer uses a different halftone screen or the same screen at a different angle, a moiré pattern can result. The resulting moiré pattern can cause a color shift or variation in tone.

Substantial effort and expense have been invested in minimizing the moiré patterns caused by halftoning techniques for producing binary renderings of continuous tone images. Misregistration, improper screen angle, and improper screen frequency can increase the halftone screens' susceptibility to moiré patterns. Additionally, because the moiré patterns can be caused by halftone screens beating with the output grid structure, the moiré pattern may be caused by a difference between the halftone screen, pitch frequencies and the re-sampling rate frequency within the image forming apparatus. Even minor variations in the dot position caused by systematic errors, such as quantization round off errors, can produce moiré patterns resulting from beat frequencies between the periodic screens.

In general, increasing the angle differences between the halftone screens reduces the prominence of moiré patterns because the interference between the image separation layers is more frequent but the amplitude of the interference is lessened. In addition to errors in frequency or in angle, the grid structure of the stimulus applied by the image output apparatus used to create the color separation layers can also contain imperfections. If the respective grid structures for all of the color separation layers do not exactly align, the halftones can be misregistered, becoming another source of moiré patterns.

Thus, the perceived quality of the resulting color image is strongly dependent on the precision with which the color separations are spatially registered with each other, as well as the precision with which the halftone screens are oriented in relationship to each other and/or to the output grid used by the image forming apparatus. Conventional halftoning methods, such as those disclosed in the incorporated 414 and 470 patents, warp, i.e., adjust or move, the image data produced by an image data generator to improve registration. Such image data generators include color and/or gray scale image generators and binary image generators. However, merely warping the image data to improve registration results in offsets with the image data that have no corresponding adjustment or warp in the halftone screens used to render the color separation layers.

Therefore, minimizing the moiré patterns conventionally includes also warping one or more of the halftone screens in a halftone screen system to correspond to the warping of the image data. This is disclosed in greater detail in U.S. Pat. No. 5,732,162 to Curry, incorporated herein by reference in its entirety. The incorporated 162 patent provides a detailed discussion of warping both image data and halftone screens.

However, the center-to-center spacing of two adjacent light beams or of two adjacent scans of a single light beam are offset by the diameter of the one or more light beams. Therefore, when the edges of an image structure, such as a halftone dot, extend across the laser beam in directions that are not substantially aligned across the high-addressability direction, the light beam cannot merely be turned on when the current scan of the light beam intersects with the image structure, such as a halftone dot, and left on until the light beam no longer intersects the image structure. Doing so would result in significantly more toner being applied to the resulting developed image at that area. This would itself result in that portion of the image having an image density that significantly departs from the desired image density represented by the image structure, such as the halftone dot. Conventionally, to avoid this change in image density, the edge of the image structure, such as the halftone dot, that extends along the high-addressability direction, and therefore, across the low-addressability direction, can be "dithered", i.e., modulated, at a very high rate, so that the actual amount of image density of the developed image more closely corresponds to the image density of the overall image structure, such as the halftone dot.

It should be appreciated that, in the preceding discussion, and throughout this disclosure, the discussed exemplary embodiments use a flying spot raster output scanner. In such raster output scanners, "horizontal" refers to the high-addressability direction, while "vertical" refers to the low-addressability direction. While the following discussion will generally use the terms horizontal and vertical to refer to the high- and low-addressability directions, it should be appreciated that there are other types of exposure systems and imagers, such as LED light bar printers or ink jet printers, that switch the directions so that it may be more convenient in such systems to refer to the high-addressability direction as the "vertical" direction and the low-addressability direction as the "horizontal" direction. For ease of understanding, the following discussing will use the terms "horizontal" and "vertical" relative to the high- and low-addressability directions. However, those of ordinary skill in the art will readily be able to determine those systems where the horizontal, rather than the vertical, edges will be aligned with the low-addressability direction.

Electronic registration refers to adjusting the spatial positions on the image substrate that the image structures, such as the halftone dots, will be placed by the image forming apparatus to compensate for any physical offsets in the image forming apparatus that would otherwise result in misregistration between the color separation layers. That is, rather than physically, i.e., mechanically, ensuring that the color separation layers are precisely aligned, the various offsets between the various color separation layers are measured. The electronic data is then electronically adjusted to change the spatial locations of the resulting image structures, so that the resulting image structures of each corresponding color separation layer are properly aligned. Being able to move or warp an image structure, such as halftone dots, without causing moiré patterns or noise that detract from the image quality will increase the utility of electronic registration.

As shown in FIG. 1, a conventional halftone cell 100 extends over a plurality of pixels 110 of an image. In the halftone cell 100, each of the pixels 110 within the halftone cell 100 are signed a different threshold value. In operation, the image value for each of the pixels 110 is compared to the threshold value assigned to that pixel 110. If the image value of that pixel 110 is greater than the threshold assigned to that pixel 110, then that pixel is turned on. Otherwise, that pixel is turned off. In alternative embodiments, the halftone cell 100 corresponds to a single image value in the input image data. In this case, each of the portions 110 of the halftone cell 100 corresponds to a subpixel. In this case, the threshold value associated with each subpixel 110 is compared with the image value associated with the halftone cell 100. If the threshold is less than the image value, that subpixel is turned on. Otherwise, that subpixel is turned off. In this way, the number of on pixels or subpixels 110 within each halftone cell 100 grows monotonically as the image value associated with that halftone cell increases.

Figure 2:
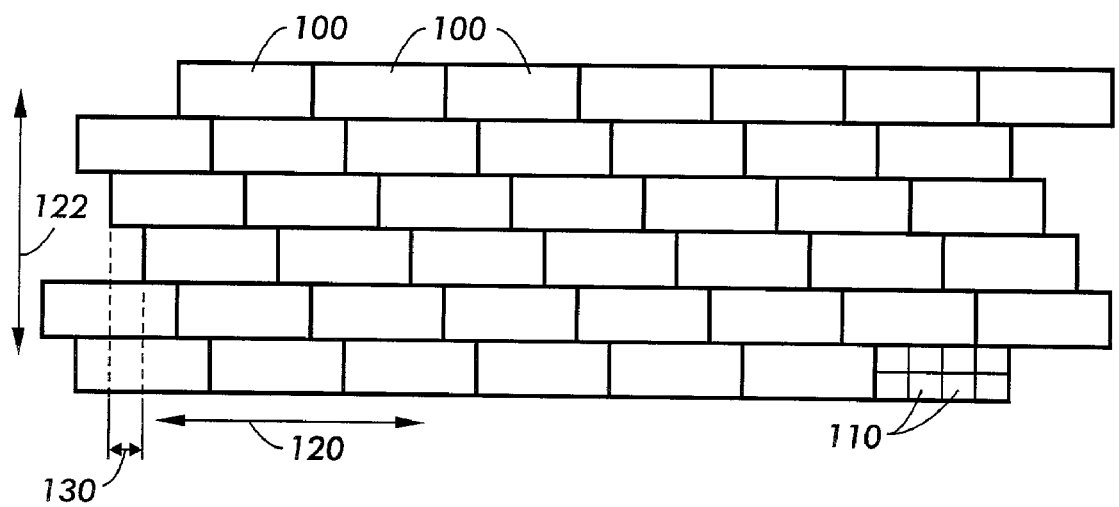
FIG. 2 illustrates one exemplary embodiment of a tiling scheme for tiling the halftone cells shown in FIG. 1.

As shown in FIG. 2, to replicate a particular halftone screen frequency and angle, the halftone cells 100 are tiled across the image. In various exemplary embodiments, these halftone cells 100 are implementations of a non-orthogonal halftone cell or an orthogonal halftone cell that is at an angle to the high-addressability direction 120 and the process direction 122. In this case, these halftone cells are Holladay bricks. Holladay bricks are described in "An Optimal Algorithm For Halftone Generation For Display And Hard Copies", T. Holladay, *Proceedings of the Society for Information Display*, Vol. 21, No. 2, pages 185–192, 1980. In Holladay bricks, the height and length of the Holladay bricks define the screen angle for the halftone screen, while the height and the offset 130 define the screen angle for the halftone screen.

As outlined above, image forming devices, such as raster output scanners and page width print bars, support high-addressability in one dimension, the dimension aligned with the high-addressability direction. For a raster output scanner or a page width print bar, the laser beam in the raster output scanner or the individual LEDs or laser diodes in the page width print bar can be turned on or turned off at a resolution or a timing that can be controlled much more finely than the time that the light beam or the emitting element must be on in order to generate a pixel on the photoreceptor. Thus, the pixel width along a scan line may be effectively limited to the base resolution of the raster output scanner or the page-width print bar, such as 600 dots per inch. In contrast, the placement or positioning of that pixel along the high-addressability direction may be controlled to a much higher resolution, such as one-1200$^{th}$ of an inch, one-2400$^{th}$ of an inch or even one-4800$^{th}$ of an inch. The ratio between the base resolution, which is fixed by the width of the laser beam or of the spot created by the emitting element in the high-addressability direction, and the ability to control the position of that laser beam or emitted light spot is the high-addressability factor. For systems where the placement of the pixel can be controlled to one-1200$^{th}$, one-2400$^{th}$, or one-4800$^{th}$ of an inch, the high-addressability factor for a base resolution of one-600$^{th}$ of an inch is 2×, 4×, or 8×, respectively.

In contrast, the distance between adjacent scan lines in a raster output scanner, or between adjacent emitting elements in a page-width print bar, and thus the placement of the scan lines on the photoreceptor, is fixed at the lower base resolution, such as 600 dots per inch. It should be appreciated that both raster output scanners and page-width print bars are similar in this respect, except that the high-addressability direction is aligned with the fast scan direction, and is orthogonal to the process direction for raster output scanners, while the fast scan direction, the process direction and the high-addressability direction are parallel in page-width print bars.

Figure 3:
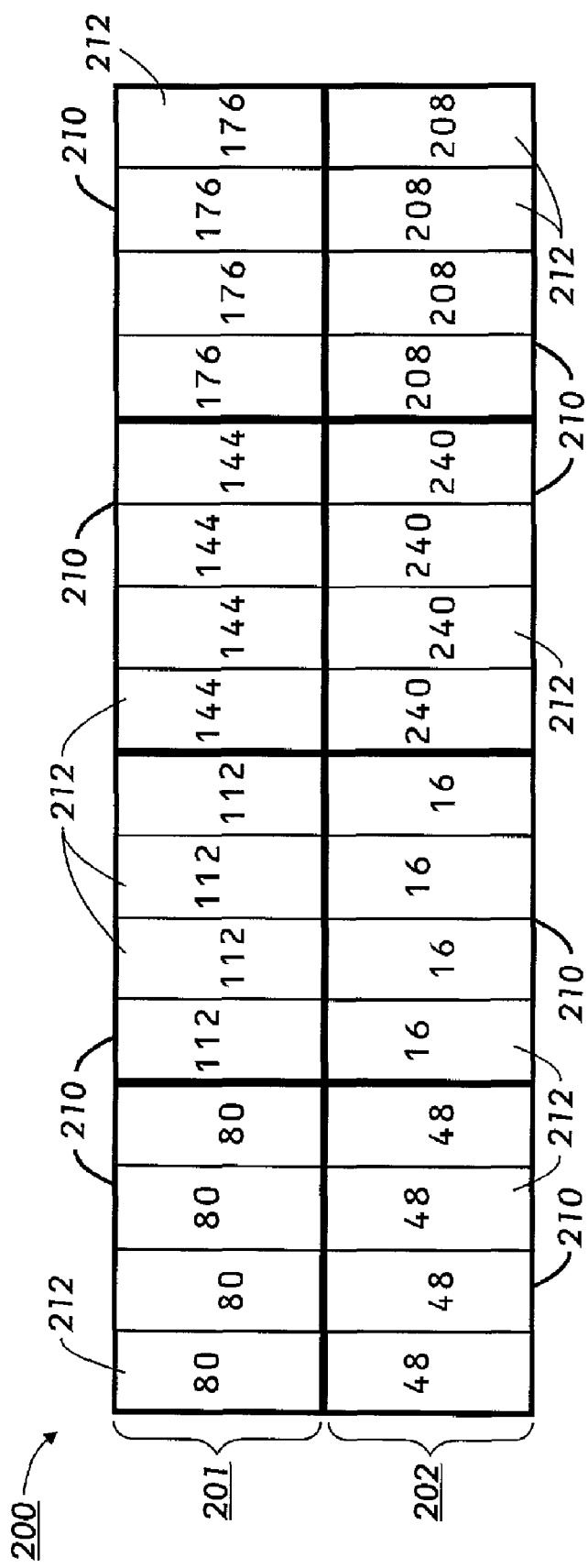
FIG. 3 illustrates one exemplary embodiment of a halftone cell defined as an array of thresholds assigned to high-addressability pixels.

FIG. 3 shows one exemplary embodiment of a halftone cell 200 defined as an array of thresholds where the array has high addressability in one dimension. As shown in FIG. 3, one method for defining the halftone cell 200 for a high-addressability system is to specify the threshold for each addressable position. This makes it appear that there are many more non-square pixels that can be controlled. However, for all practical purposes, the high-resolution pixels 212 of the individual pixels or subpixels 210 should not be treated as completely independent. Rather, these thresholds should be arranged to turn on the subpixels in blocks, since independent and even small groups of high-resolution pixels may not develop an image.

Figure 4:
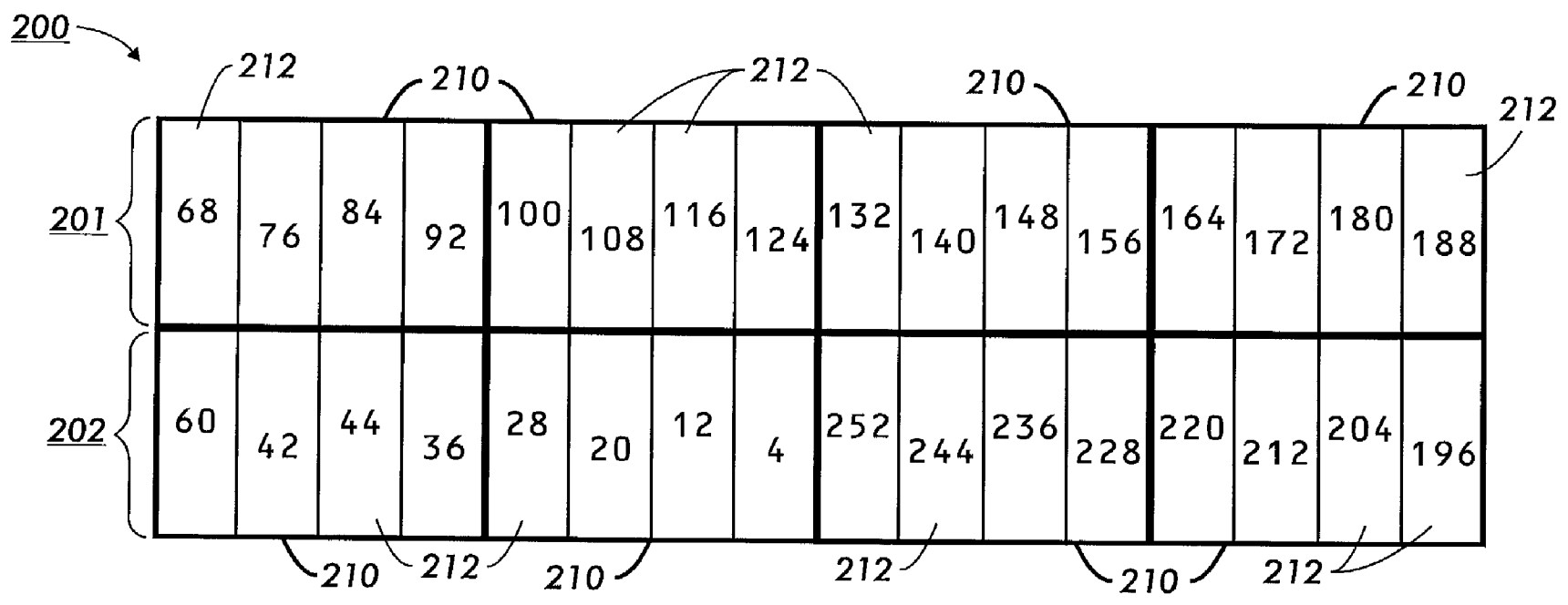

As shown in FIG. 4, while the threshold values should be arranged to generate blocks of the high-addressability pixels that are on or off, the threshold values in the high-addressability pixels 212 of a pixels or subpixel 210 need not all be the same. Additionally, blocks of different widths could be generated. This use of high addressability to create pulses of different widths is one of the main reasons for implementing high addressability. In general, the particular threshold values that are implemented and assigned to the various high-resolution pixels 212 are not important. As long as the thresholds are assigned at the high-addressability resolution, it becomes straightforward to shift the position of the halftone dot by the high-addressability resolution in one dimension, as shown in FIG. 5.

Figure 5:
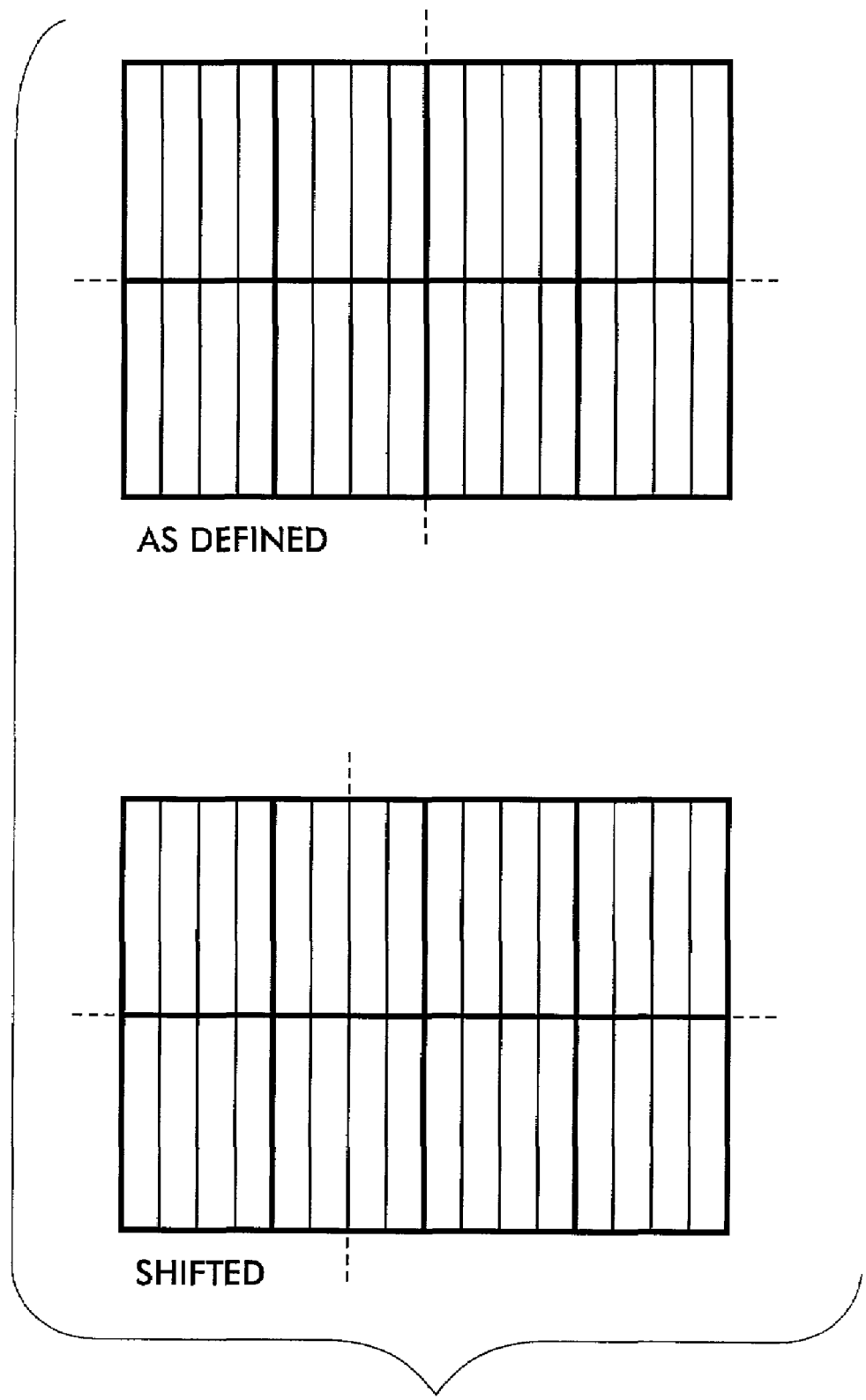
FIG. 5 illustrates how the position of the halftone dot can be shifted in the high-addressability or fast scan direction.
Figure 7:
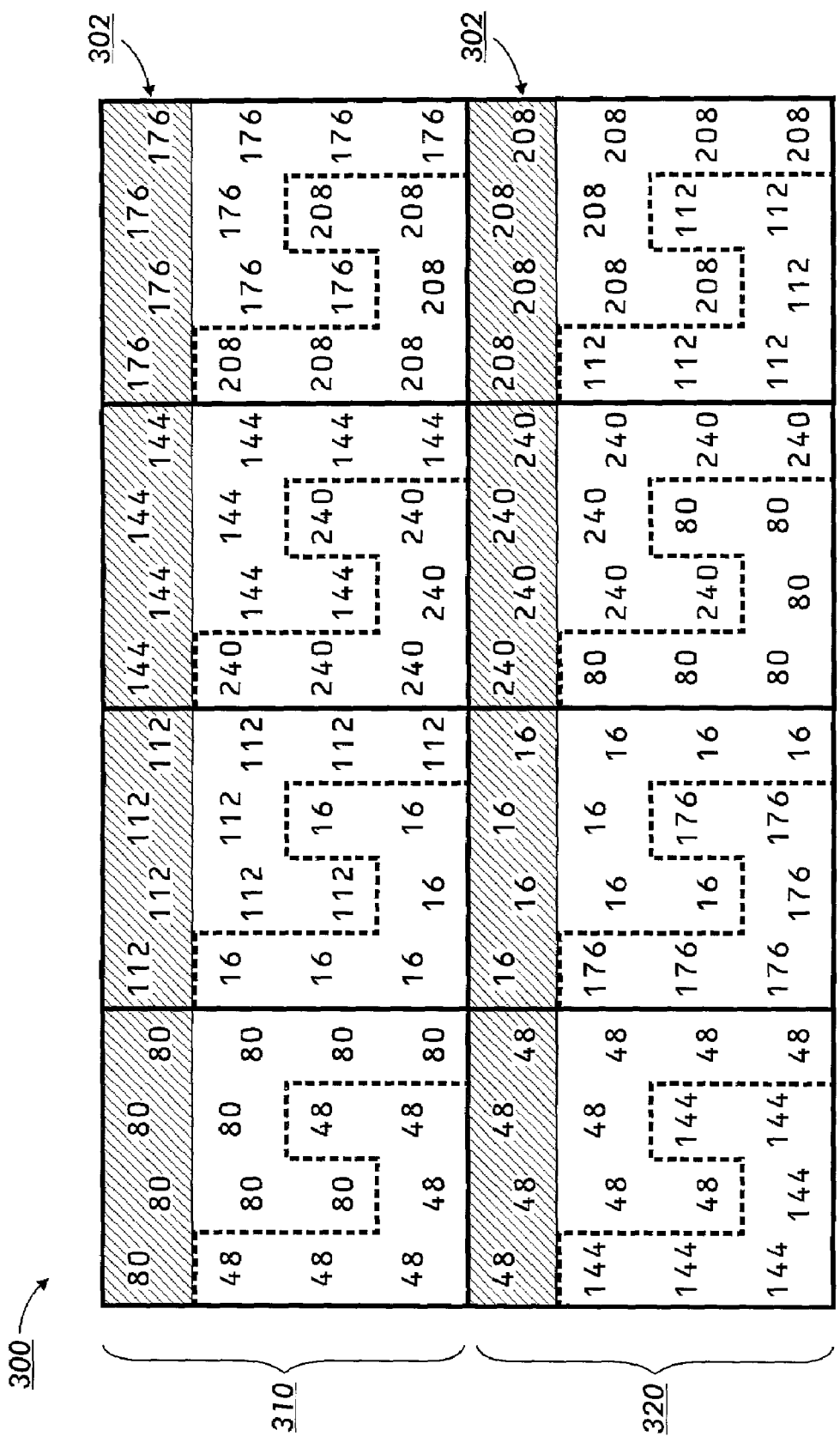
FIGS. 7–10 illustrate how the halftone screen or a halftone dot is shifted in the low-addressability or process direction based on selecting different ones of the subrows.
Figure 8:
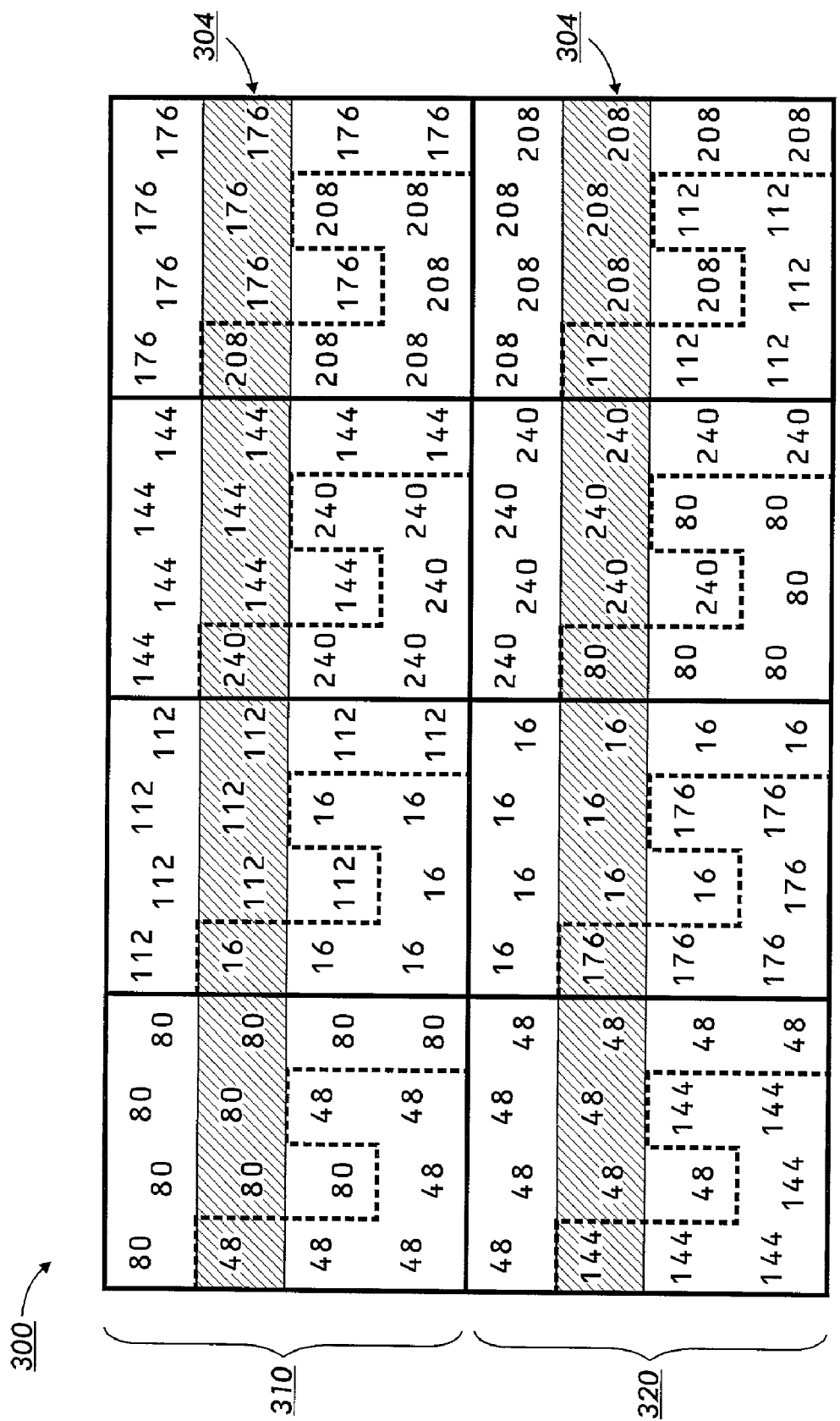
Figure 9:
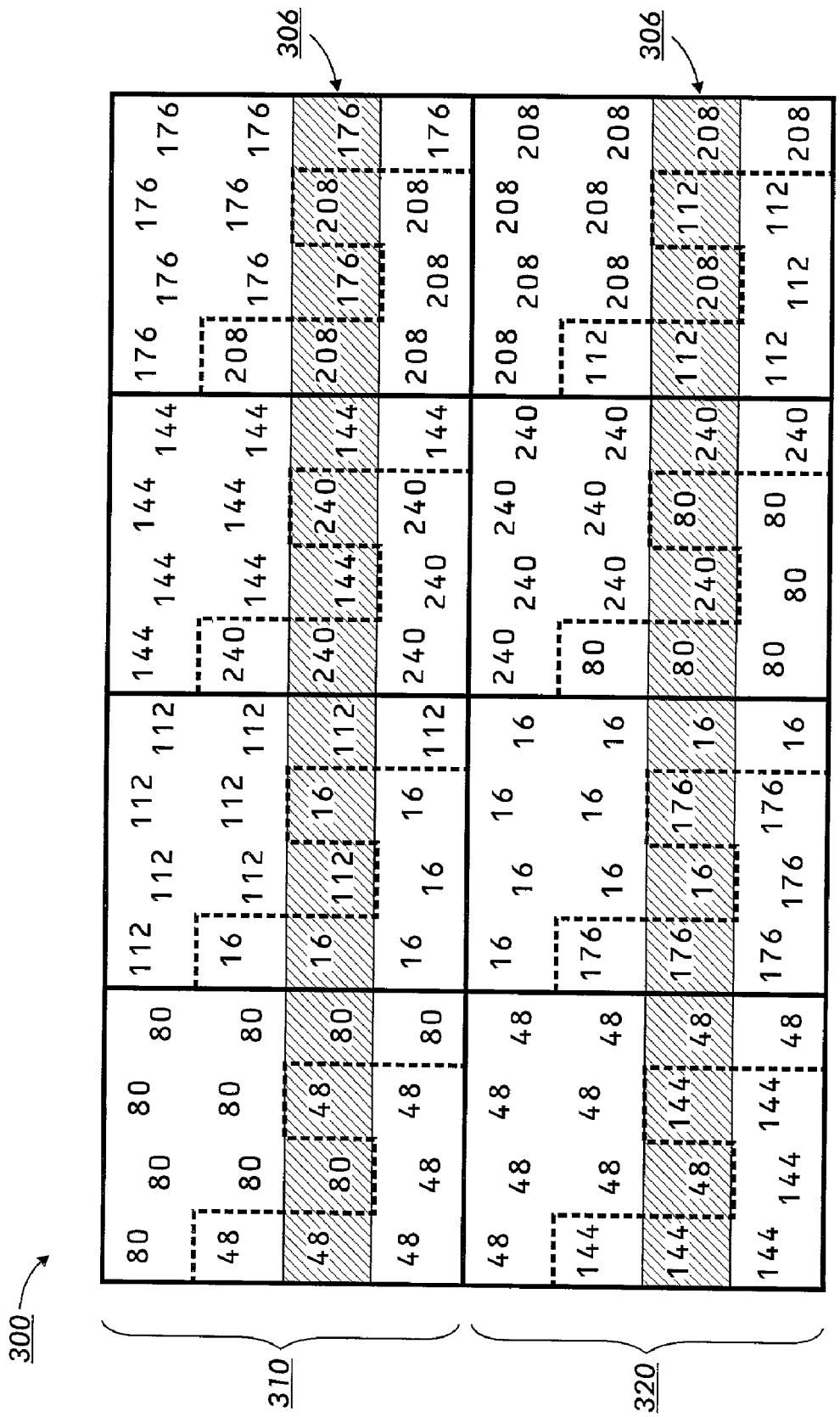
Figure 10:
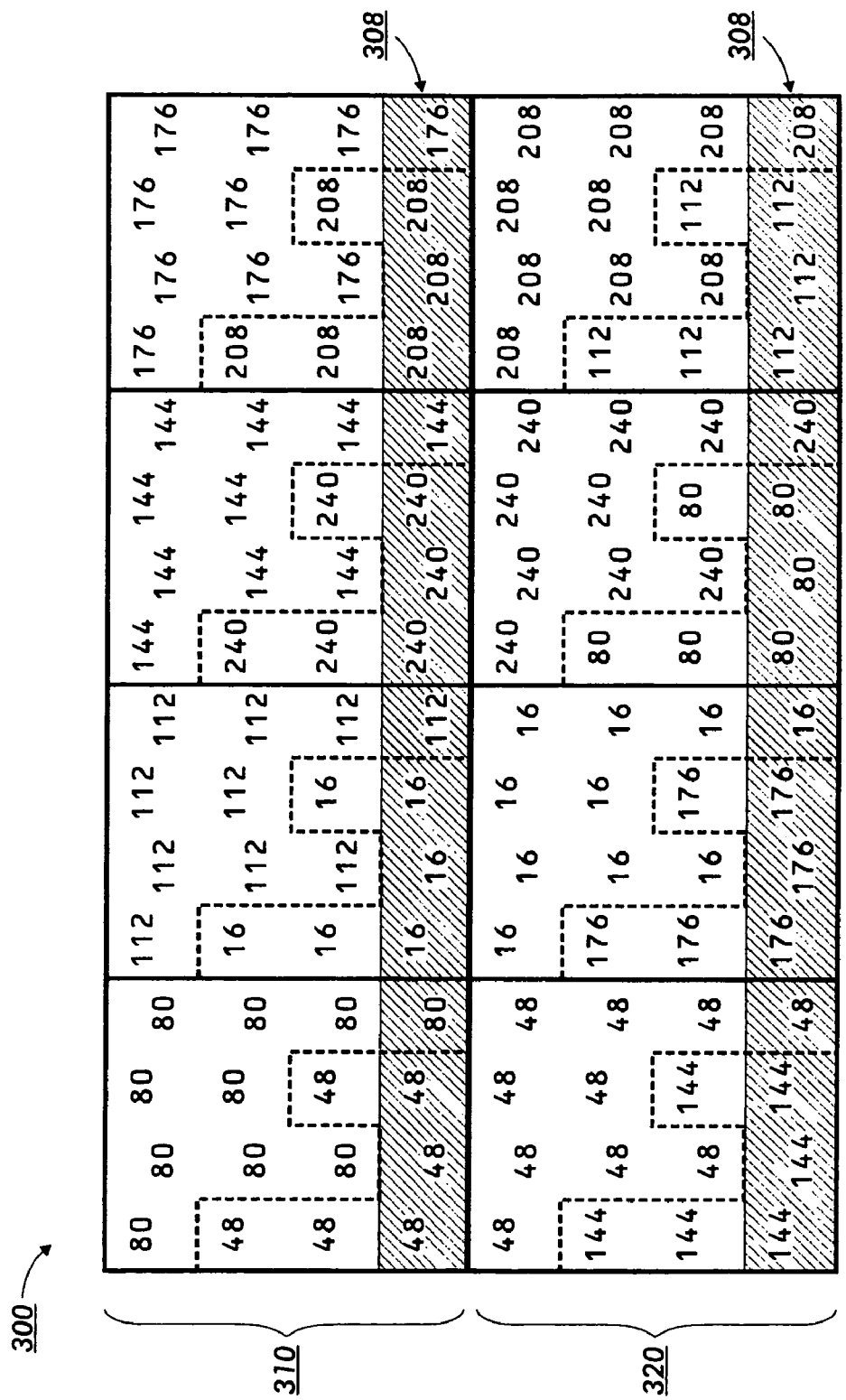

However, while it is relatively straightforward to shift the position of the halftone screen dot in the high-addressability direction, as illustrated in FIG. 5, this technique provides no ability to shift the halftone in the low-addressability direction.

In various exemplary embodiments of the systems and methods according to this invention, each pixel of the halftone cell is first divided into high-addressability pixels at the high-addressability factor. The high-addressability factor is the ratio between the base resolution and the high-addressability resolution. Each row of high-addressability pixels is then divided into subrows, so that the threshold values are defined at a higher resolution in the low-addressability direction than the base resolution in the low-addressability direction. In various exemplary embodiments, this higher resolution for the low-addressability direction is the same as the high-addressability resolution. That is, in such exemplary embodiments, each row is divided into subrows using the same high-addressability factor.

Figure 6:
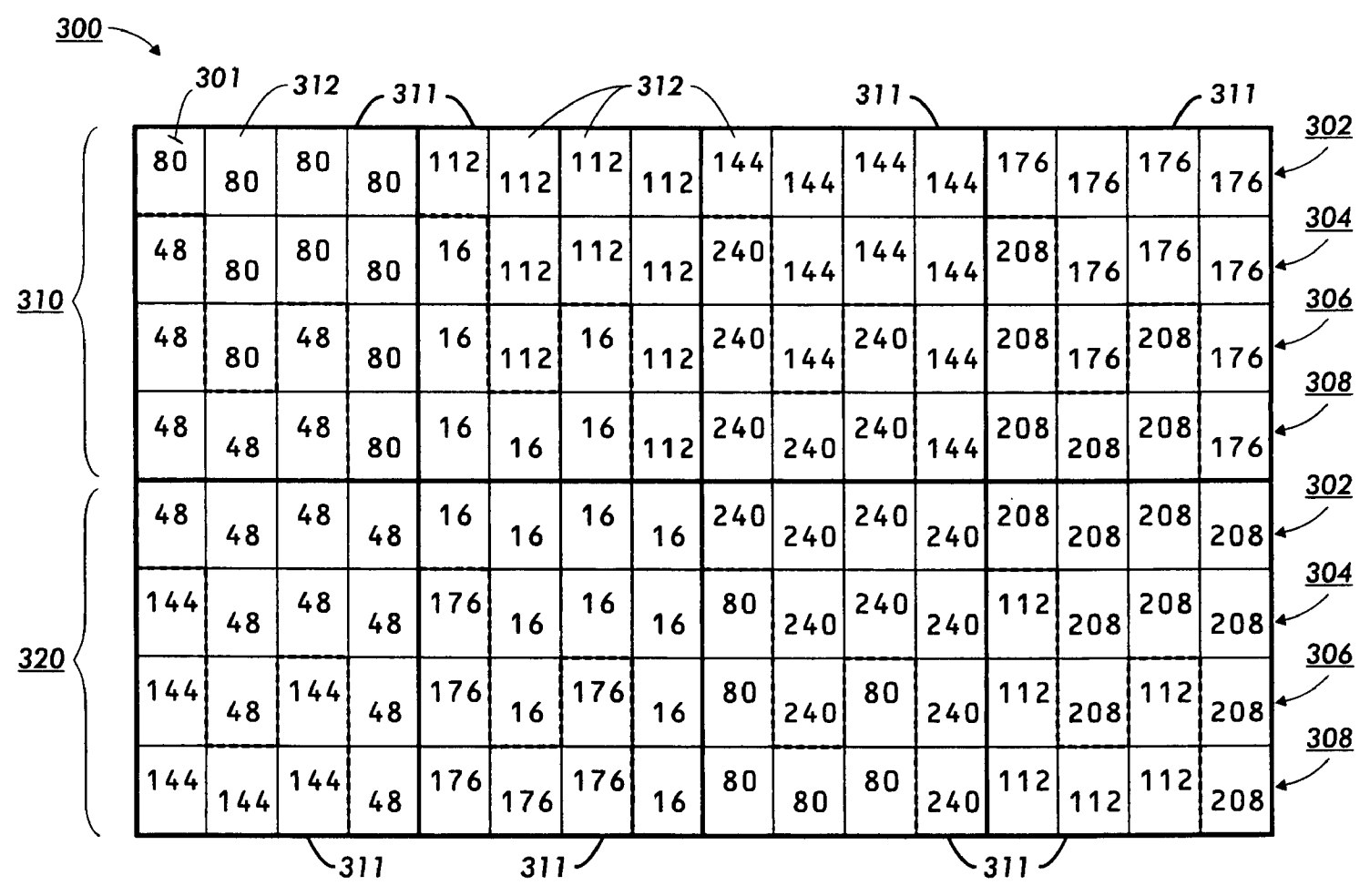

FIG. 6 illustrates one exemplary embodiment of a high-addressability halftone cell according to this invention in which it is possible to shift the halftone screen or dot in the low-addressability direction. As shown in FIG. 6, each of the halftone rows 310 and 320 of the halftone cell 300 are divided into four subrows 302, 304, 306 and 308. Accordingly, it becomes possible to define the halftone cell 300 as an array of threshold values, where the array has the high-addressability resolution in the high-addressability direction and has a higher-than-base resolution in the low-addressability direction. This allows a partial-bitting pattern to be defined in the high-addressability pixels that allows interpolation between the low-addressability rows.

As set forth above, each row of high-addressability pixels is divided into subrows, so that the threshold values are defined at a higher resolution in the low-addressability direction than the base resolution. In various exemplary embodiments, this higher resolution for the low-addressability direction is the same as the high-addressability resolution. That is, in such exemplary embodiments, each row is divided into subrows using the same high-addressability factor. Thus, in various exemplary embodiments, the array has the high-addressability resolution in both directions.

However, it should be appreciated that it is not necessary to use the high-addressability resolution in both the low-addressability direction and the high-addressability direction. Rather, each row of the halftone cell 300 can be divided into any integer number of subrows to obtain the desired higher-than-base resolution for the low-addressability direction of the halftone cell 300.

It should be appreciated that the actual image forming apparatus or device has high-addressability resolution only along the high-addressability direction. That is, the actual image forming apparatus does not provide the stimulus at a resolution along the low-addressability direction at the higher-than-base resolution used in the halftone cell 300. As a result, it is not possible to use all of the subrows 302–308 when imaging. Rather, the subrows 302–308 are used at the low addressability rate by selecting one of the subrows 302–308 for each scan line. By appropriately selecting the particular subrows 302–308, it becomes possible to shift the halftone dot in the low-addressability direction at a factional distance of the slow-scan resolution.

In the exemplary embodiments according to this invention, partial bitting refers to the high-frequency modulation between a first threshold value that is normally associated with one of the slow-scan rows of the halftone cell and a second threshold value that is normally associated with another one of the slow-scan rows of the halftone cell. In particular, the two threshold values are modulated at the high-addressability resolution, depending on the particular subrow that has been selected for the halftone dot or the halftone screen. However, due to one or more different low-pass filter effects, which are described in detail below, the edge of the overall halftone dot in the low-addressability direction (i.e., the edge parallel to the high-addressability direction) does not follow this high-frequency modulation, but instead averages this high-frequency modulation to place the edge at a generally average position between the positions of the two rows of the halftone cell based on the relative numbers of threshold values associated with the two rows of the selected subrow.

For example, as shown in FIG. 6, the halftone threshold values assigned to the various high-addressability pixels 312 of the rows 310 and 320 for the first subrow 302 are identical to the threshold values for the high-addressability pixels 212 for the two rows 201 and 202 shown in FIG. 3. Thus, by picking the first subrow 302 for a particular scan line and a particular halftone cell, the same halftone pattern for a particular set of image data would be created using the halftone cells 300 shown in FIG. 6 as when using the halftone cell 200 shown in FIG. 3. In contrast, if the second subrow 304 were selected, the second subrow 304 has only three of every four pixels that have threshold values that match the threshold values of the corresponding pixel or subpixel 210 of one row 201 or 202 of the halftone cell 200 shown in FIG. 3, while the fourth high-addressability pixel in the second subrow 304 matches the threshold value of one of the pixels or subpixels 210 in the other row 202 or 201, respectively, of the halftone cell 200. Thus, when the second subrow 304 is used, a halftone dot pattern that is a ¾–¼ mixture of the two rows 201 and 202 of the halftone cell 200 is obtained.

Similarly, when using the third subrow 306, halftone dot patterns are generated that equally combine the threshold values of the two rows 201 and 202 of the halftone cell 200 shown in FIG. 3. Finally, when using the fourth subrow 308, only one of the high-addressability pixels 312 has a threshold value that is the same as the threshold value in the correspondingly-positioned pixel or subpixel 210 the one row 201 or 202 of the halftone cell 200. The other three high-addressability pixels 312 in each pixel or subpixel 311 have threshold values that correspond to the threshold values in the other one of the rows 201 or 201, respectively, of the halftone cell 200. As a result, in effect, shifting the halftone position along the low-addressability direction is accomplished by shifting the selection of the subrows in the interpolated halftone pattern shown in FIG. 6. This is illustrated in FIGS. 7–10, which indicate the particular threshold values that will be used for each of the high-addressability pixels 312 depending on which ones of the subrows 302–308 are selected.

As indicated above, for each particular subrow 302, 304, 306 or 308, some of the threshold values of a particular row 310 or 320 are associated with the threshold value for that row 310 or 320, while the other threshold values for the high-addressability pixels 312 correspond to the threshold values for the other row 320 or 310, respectively.

When a pixel having a continuous tone image value is to be halftoned using, for example, the halftone cell 300 shown in FIG. 6, a particular one of the subrows 302, 304, 306 or 308 is first selected. Then, based on the selected subrow 302, 304, 306 or 308, the continuous tone image value is compared to the threshold values for each high-addressability pixel 312 for the selected one of the subrows 302, 304, 306 or 308. For example, for a continuous tone image value of 148, if the first subrow 302 were selected, the first three pixels 301 of the top row 310 would be activated, as would the first two pixels 301 of the second row 320. In contrast, the right-most pixel 301 of the first row 310 and the two right-hand pixels 301 of the second row 320 would not be activated. In contrast, if the second row were selected, the eight left-most subpixels 312 of the top row 310, as well as the tenth-twelfth high-addressability pixels 312 of the top row 310, would be activated. In contrast, the ninth and thirteenth-sixteenth high-addressability pixels 312 would not be activated. Similarly, in the second row 320, the first-fourth, sixth-ninth and thirteenth high-addressability pixels 312 would be activated while the fifth, tenth-twelfth and fourteenth-sixteenth high-addressability pixels 312 of the second row 320 would not be activated. In this case, the position of the edge in the low-addressability direction for the third pixel 301 in the top row 310 is three-fourths of the distance between the first and second rows, as is the second pixel 312 of the second row 320. In contrast, for the third and fourth pixels 312 of the second row 320, the edge of the halftone dot and the low-addressability direction is only one-fourth of the distance between the first row 310 and the second row 320.

When the halftone image is being formed using a xerographic image forming apparatus, the physics of dissipating charges on the photoreceptor in response to this high-frequency modulation of the laser beam or light emitting element, as the laser beam or light emitting element moves past the photoreceptor in the high-addressability direction, causes only the average, low-frequency portion of this modulation to be physically written onto the photoreceptor. That is, the xerographic process itself acts as a low-pass filter that converts this high frequency modulation into a low-frequency average. This low frequency average is reflected as an overall spatial shift in the position of the edge in the low-addressability direction.

Similarly, even if a xerographic image forming apparatus is not used, the human visual system will also tend to act as a low-pass filter that converts this high frequency spatial modulation of the high-addressability pixels into the low-pass, or average, position reflected by this high-frequency modulation. Thus, due to the small size of the high-resolution pixels and the averaging effects of the human visual system, rather than seeing the actual high frequency modulation, the human visual system would instead see the low-frequency average, which appears as a shift in the edge in the low-addressability direction between the low-addressability direction scanlines.

Figure 11:
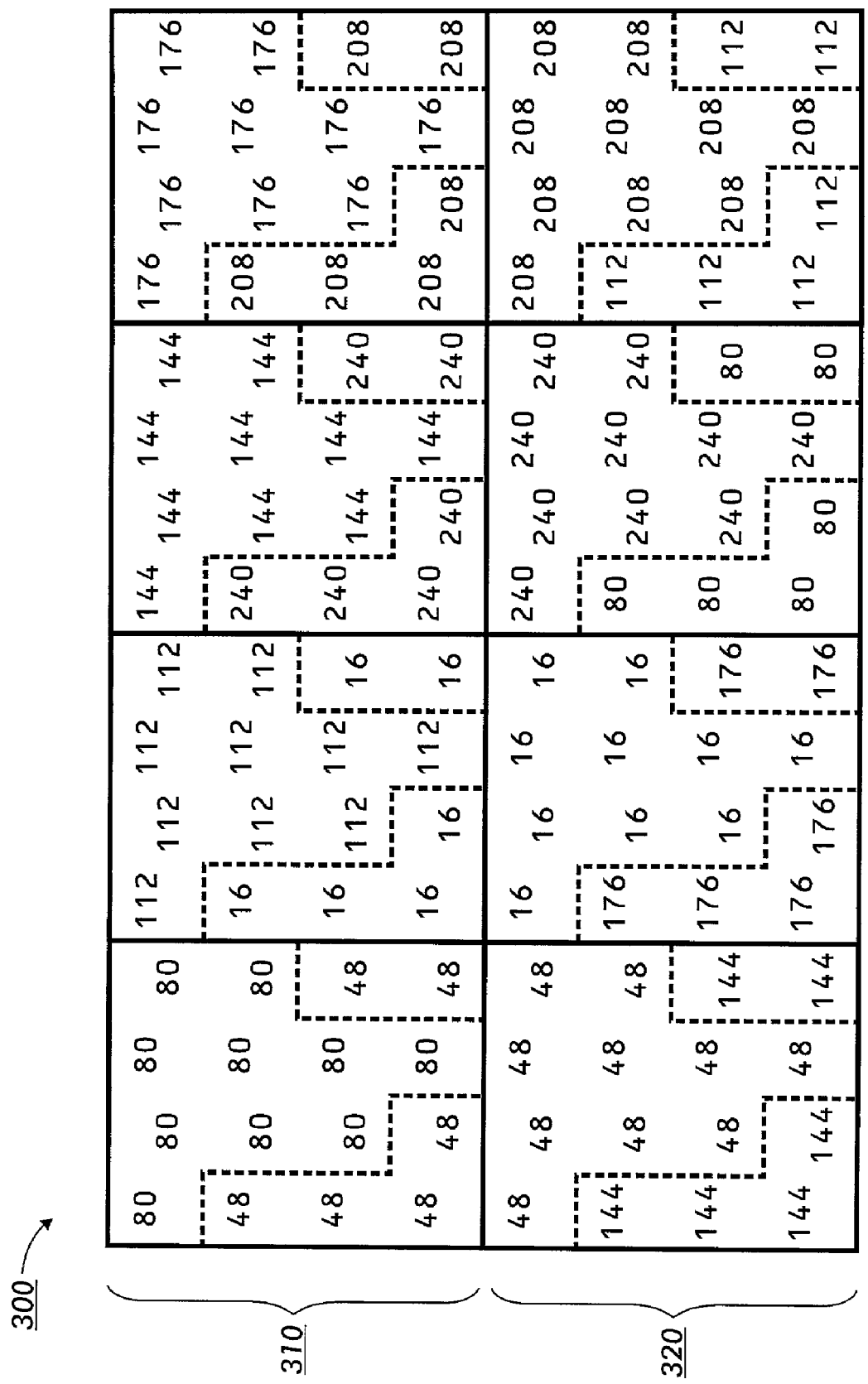
FIG. 11 illustrates a second exemplary embodiment of the threshold array according to this invention, where the threshold values are distributed according to a triangular interpolation pattern.
Figure 12:
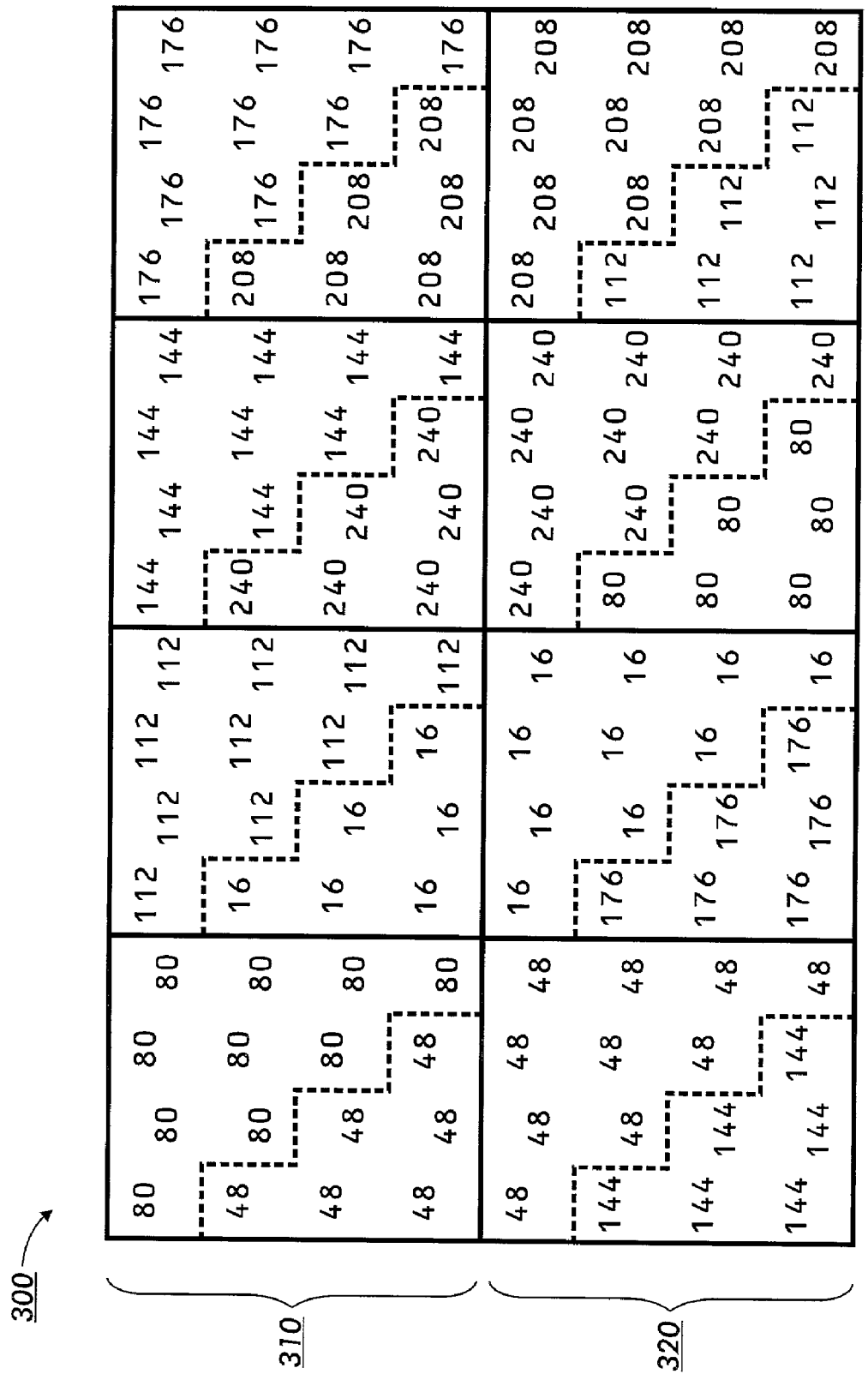
FIG. 12 illustrates a third exemplary embodiment of the threshold array according to this invention, where the threshold values are distributed according to a saw tooth pattern.

It should be appreciated that, in FIGS. 6–10, a dither pattern is used to distribute the threshold values between the subrows 302–308 to interpolate between the rows 310 and 320 of the halftone cell 300. However, it should be appreciated that other interpolation patterns could be used. For example, as shown in FIG. 11, a triangular pattern could be used. Similarly, as shown in FIG. 12, a saw tooth pattern could be used. It should be appreciated that any desirable pattern for distributing the threshold values among the high-addressability pixels 312 within each of the halftone pixels or subpixels 301 can be used and are within the scope of this invention. The particular distribution pattern for the threshold values should be chosen to give the best transition between the halftone rows, such as the rows 310 and 320, based on the marking technology implemented in the image forming device that the systems and methods according to this invention are being used with. Similarly, while FIGS. 3–12 illustrate halftone pixels or subpixels 210 and 301 that use 4× high addressability, any desired high-addressability factor, such as 2× or 8×, for example, could be used and is within the scope of this invention.

Figure 13:
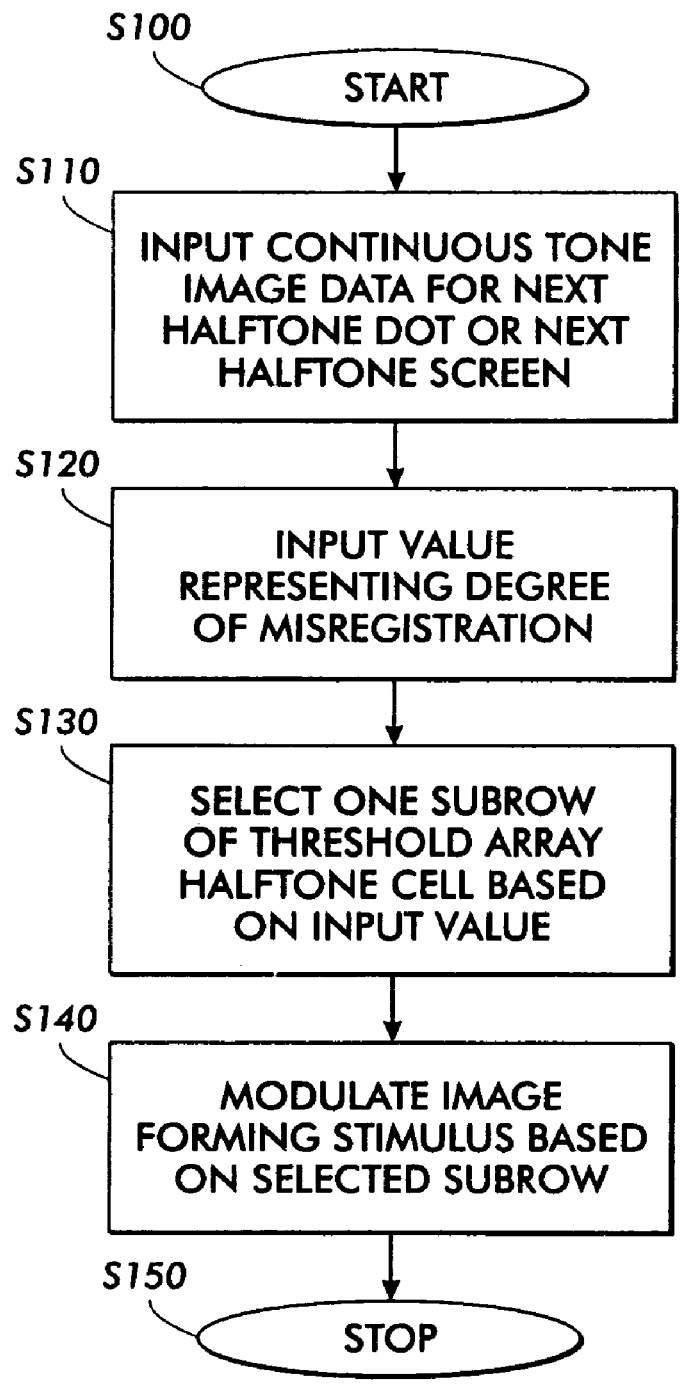
FIG. 13 is a flowchart outlining one exemplary embodiment of a method for shifting a halftone dot in the low-addressability direction according to this invention.

FIG. 13 is a flowchart outlining one exemplary embodiment of a method for shifting an edge, extending along a high-addressability direction, in the low-addressability direction according to this invention. Beginning in step S100, operation continues to step S110, where a continuous tone image value for a next halftone cell is input. Then, in step S120, a value that represents a degree of misregistration for at least the current halftone cell is input. It should be appreciated that the degree of misregistration can be determined using any known or later-developed system that is able to characterize the amount of misregistration of the halftone screen, or at least the amount of misregistration of the current halftone cell, at a spatial resolution that is less than the slow scan resolution. Operation then continues to step S130.

In step S130, based on the amount of sub-scanline misregistration, a particular one of the subrows of the rows for the current halftone cell is selected. Next, in step S140, the image-forming stimulus is modulated at the high-addressability resolution by comparing the continuous tone image value for the current halftone cell to the threshold values for the high-addressability pixels of the selected subrow. As outlined above, due to the low-pass filtering effects of either the image forming apparatus and/or the human visual system, the current halftone cell is formed with the edge of the edges in the halftone cell that extend along the high-addressability direction shifted along the low-addressability direction based on the selected subrow. Operation then continues to step S150, where the method ends. It should be appreciated that steps S130 and S140, and optionally S120, are repeated for each halftone cell in the halftone image being generated.

Figure 14:
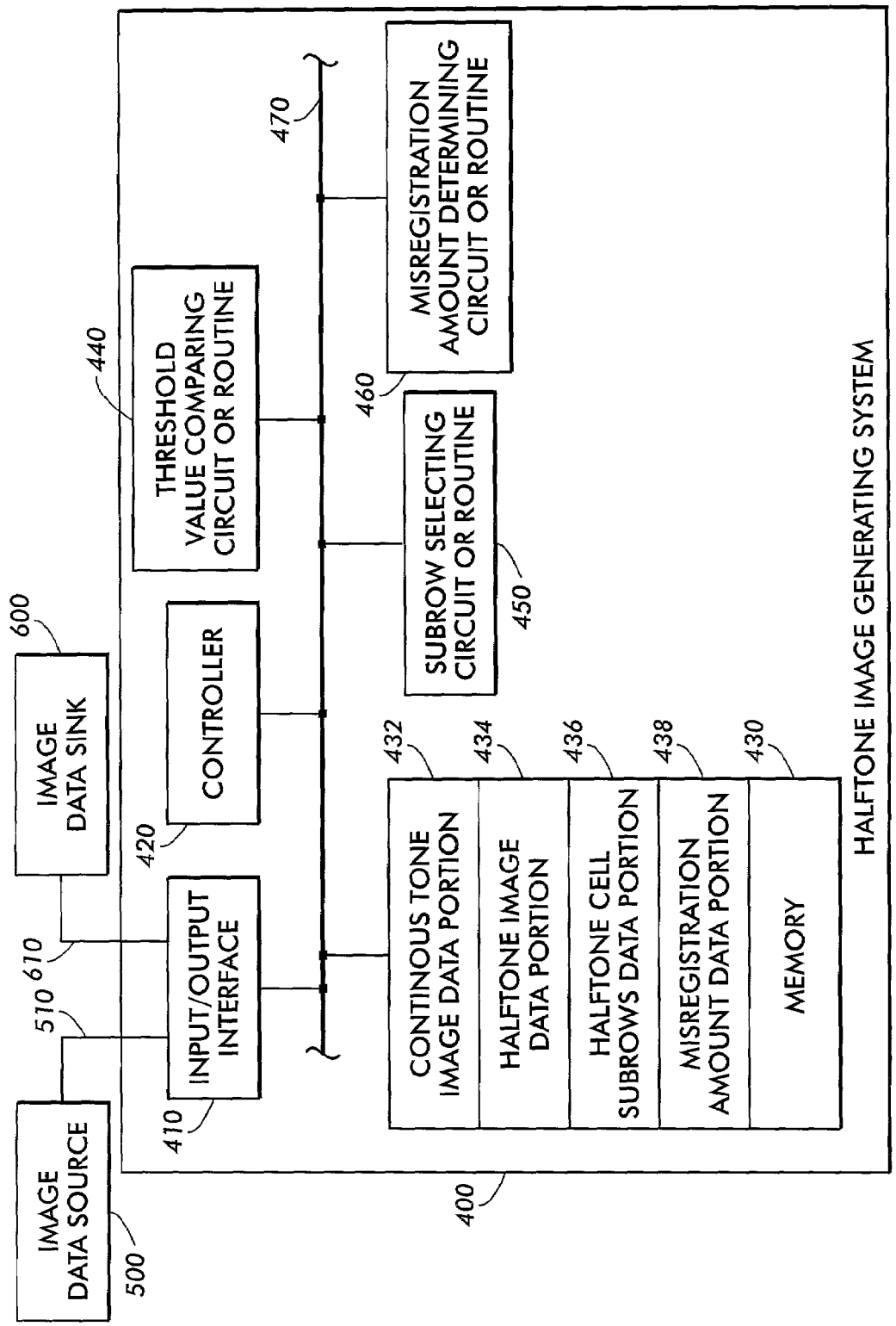
FIG. 14 is a block diagram of one exemplary embodiment of a system that shifts a halftone dot in the low-addressability direction according to this invention.

FIG. 14 shows a block diagram outlining one exemplary embodiment of a halftone image generating system 400 that generates a halftone image having sub-scanline resolution in the low-addressability direction according to this invention. As shown in FIG. 14, continuous tone image data is supplied to the halftone image generating system 400 from an image data source 500 over a link 510. The generated halftone image is output by the halftone image generating system 400 over a link 610 to an image data source 600.

In particular, the image data source and the image data sink 500 and 600 are respectively connected to an input/output interface 410 of the halftone image generating system 400 over the links 510 and 610. As shown in FIG. 14, in addition to the input/output interface 410, the halftone image generating system includes a controller 420, memory 430, a threshold value comparing circuit or routine 440 and a subrow selecting or routine circuit 450, each connected by a data and/or control bus 470. As shown in FIG. 14, the halftone image generating system 400 can optionally include a misregistration amount determining circuit or routine 460.

In various exemplary embodiments, the image data sink 600 outputs signals to the halftone generating system 400 that indicates the amount of sub-slow scan resolution misregistration for the halftone image, or at least the amount of sub-slow scan resolution misregistration for the current halftone cell. Alternatively, the image data sink 600 can merely output information from which the amount of sub-slows can-resolution misregistration can be determined. In this case, the optional misregistration amount determining circuit or routine 460 would be used to determine the amount of sub-slow scan-resolution misregistration that is present. In either case, the amount of sub-slow scan-resolution misregistration is input by the subrow selecting circuit or routine 450. The subrow selecting circuit or routine 450 selects a particular one of the subrows, defined for the various rows of the current halftone cell, to be used based on the amount of sub-slow scan-resolution misregistration that is present.

As shown in FIG. 14, the memory 430 can include one or more of a continuous tone image data portion 432, a halftoned image data portion 434, a halftone subrows data portion 436, and a misregistration amount data portion 438. The continuous tone image data portion 432 stores the continuous tone image data received from the image data source 500 over the link 510 and input through the input/output interface 410 and, under control of the controller 420, stored in the memory 430. The halftoned image data portion 434 stores the halftoned image data generated by the threshold value comparing circuit or routine 440. The halftone cell subrows data portion 436 stores the threshold array values of the various halftone subrows that will be used by the threshold value comparing circuit or routine 440. The misregistration amount data portion 438 stores the misregistration amount data used by the subrow selecting circuit error routine 450 to select one of subrows stored in the halftone cell subrows data portion 436.

The memory 430 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-writeable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

Based on the threshold values for each of the high-addressability pixels associated with the selected subrow, the threshold value comparing circuit 440 compares the various threshold values of the selected subrow to the image value to be halftoned. The results of the threshold operation, which is a string of binary values that indicate whether the image forming apparatus stimulus is to be turned on or turned off, is output to the image data sink 600.

As outlined above, if the image data sink 600 is an image forming apparatus, the string of binary values output by the halftone generating system 400 through the input/output interface 410 and over the link 610 is used by the image forming apparatus to generate the halftone image. In contrast, if the image data sink 600 merely stores the halftone image data for later rendering by an image forming apparatus, the string of binary values is saved in memory or the like.

The halftone image generating system 400 is, in various exemplary embodiments, implemented on a programmed general-purpose computer. However, the halftone image generating system 400 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIG. 13, can be used to implement the halftone image generating system 400.

Moreover, the halftone image generating system 400 can be implemented as software executing on a programmed general purpose computer, a special purpose computer, a microprocessor or the like. In this case, the halftone image generating system 400 can be implemented as a routine embedded in a printer driver, as a resource residing on a server, or the like. The halftone image generating system 400 can also be implemented by physically incorporating it into a software and/or hardware system, such as the hardware and software systems of a printer or a digital photocopier.

The image data source 500 can be a digital camera, a scanner, or a locally or remotely located computer, or any other known or later-developed device that is capable of generating electronic image data. Similarly, the image data source 500 can be any suitable device that stores and/or transmits electronic image data, such as a client or a server of a network. The image data source 500 can be integrated with the halftone image generating system 400, as in a digital copier having an integrated scanner. Alternatively, the image data source 500 can be connected to the halftone image generating system 400 over a connection device, such as a modem, a local area network, a wide area network, an intranet, the Internet, any other distributed processing network, or any other known or later developed connection device.

It should also be appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 500 is thus any known or later developed device that is capable of supplying electronic image data over the link 510 to the halftone image generating system 400. The link 510 can thus be any known or later-developed system or device for transmitting the electronic image data from the image data source 500 to the halftone image generating system 400.

While FIG. 14 shows the halftone image generating system 400 as a separate device from the image data source 500, the halftone image generating system 400 may be an integrated device, such as a digital copier, computer with a built-in printer, or any other integrated device that is capable of producing a hard copy image output. With such a configuration, for example, the image data source 500, the halftone image generating system 400 and the image data sink 600 may be contained within a single device.

Alternatively, the halftone image generating system 400 may be a separate device attachable upstream of a stand alone image data sink 600, such as a hard copy output device. For example, the halftone image generating system 400 may be a device that interfaces with both the image data source 500 and one or more image data sinks 600. For example, the halftone image generating system 400 may be incorporated into a network print server that manages printer data for a plurality of the same or different printer devices.

Furthermore, the halftone image generating system 400 may be implemented as software on the image data sink 600 or the image data source 500. Other configurations of the elements shown in FIG. 14 may be used without departing from the spirit and scope of this invention.

When the image data source 500 is a personal computer, the link 510 connecting the image data source 500 to the halftone image generating system 400 can be a direct link between the personal computer and the halftone image generating system 400. The link 510 can also be a local area network, a wide area network, the Internet, an intranet, or any other distributed processing and storage network. Moreover, the link 510 can also be a wireless link between the image data source 500 and the halftone image generating system 400. Accordingly, it should be appreciated that the image data source 500 can be connected using any known or later-developed system that is capable of transmitting data from the image data source 500 to the halftone image generating system 400. Similarly, the image data sink 600 can be any known or later-developed device that is capable of receiving the halftone image data output by the halftone image generating system 400 and either storing, transmitting, or displaying the halftone image data. The storage device can be any known structural apparatus for indefinitely storing the enhanced image data, such as a RAM, a hard drive and disk, a floppy drive and disk, an optical drive and disk, a flash memory or the like.

The signal lines or links 510 and 610 can each can be a public switched telephone network, a local or wide area network, an intranet, the Internet, any other distributing network, or the like.

The links 510 and 610 can each be any known or later developed device or system for connecting the scanner 400 to the scanned image registration system, including a direct cable connection, a connection over a public switched telephone network, a connection over a wide area network or a local area network, a connection over an intranet or an extranet, a connection over the Internet, a wireless transmission channel, or a connection over any other distributed processing network or system. In general, the links 510 and 610 can each be any known or later developed connection system or structure usable to connect the image data source 500 or the image data sink 600, respectively, to the halftone image generating system 400.

While the invention has been described in conjunction with the exemplary embodiments outlined above, it is evident that many alternatives, modifications and variations will be to those skilled in the art. Accordingly, the exemplary embodiments of the invention, as set forth above, are intended to be illustrative, not limiting. Various changes may be made without departing from the spirit and scope of the invention.

What is claimed is:

1. A halftone cell of a threshold array halftone screen, comprising:

a plurality of pixels arranged into at least one row of pixels, each pixel having a first dimension along a high-addressability direction and a second dimension along a low-addressability direction; and a plurality of high-addressability pixels defined in each of the plurality of pixels, each high-addressability pixel having a first dimension along the high-addressability direction and a second dimension along the low-addressability direction, where a ratio between the first and second dimensions of the plurality of high addressability pixels defines a high-addressability factor;

wherein:

each high-addressability pixel is divided along the low-addressability direction to define a plurality of subcells of the pixels of the halftone cell, each subcell having a threshold value, the plurality of subcells of each of the at least one row of the halftone cell arranged into a plurality of subrows; and each of the plurality of subrows is selectable as the set of threshold values for the high-addressability pixels of the halftone cell to at least effectively shift the halftone cell along the low-addressability direction by an amount corresponding to the selected one of the plurality of subrows.

2. The halftone cell of claim 1, wherein the threshold values are distributed between the subrows according to a predefined pattern.

3. The halftone cell of claim 2, wherein the threshold values are distributed in the predefined pattern between the subrows to interpolate between the different threshold values.

4. The halftone cell of claim 3, wherein selecting a different one of the subrows provides a different interpolation between the threshold values.

5. The halftone cell of claim 2, wherein the predefined pattern into which the threshold values are distributed is one of a dither pattern, a triangular pattern and a sawtooth pattern.

6. The halftone cell of claim 1, wherein the subcells within a given pixel of the halftone cell have a limited number of different threshold values.

7. The halftone cell of claim 6, wherein the limited number of different threshold values within a given pixel is two.

8. The halftone cell of claim 7, wherein the two different threshold values are distributed between the subrows according to a predefined pattern.

9. The halftone cell of claim 8, wherein the predefined pattern into which the two different threshold values are distributed is one of a dither pattern, a triangular pattern and a sawtooth pattern.

10. A halftone screen comprising a plurality of the halftone cells of claim 1.

11. A method for converting a color separation layer of a continuous tone image into a threshold-array halftoned binary color separation layer, comprising:
   determining, for at least one portion of the color separation layer, a shift amount along a low-addressability direction;
   applying a threshold array halftone screen to the one color separation layer, the threshold array halftone screen comprising a plurality of halftone cells, each halftone cell comprising:
      a plurality of pixels arranged into at least one row of pixels, each pixel having a first dimension along a high-addressability direction and a second dimension along the low-addressability direction, and
      a plurality of high-addressability pixels defined in each of the plurality of pixels, each high-addressability pixel having a first dimension along the high-addressability direction and a second dimension along the low-addressability direction, where a ratio between the first and second dimensions of the plurality of high addressability pixels defines a high-addressability factor, wherein each high-addressability pixel is divided along the low-addressability direction to define a plurality of subcells of the pixels of the halftone cell, each subcell having a threshold value, the plurality of subcells of each of the at least one row of the halftone cell arranged into a plurality of subrows;
   selecting, for each of at least one of the at least one portion of the color separation layer for which a shift amount has been determined, one of the plurality of subrows of the halftone cell corresponding to that portion of the color separation layer based on the determined shift amount; and
   threshold array halftoning that portion of the color separation layer based on the threshold values within the selected subrow of the corresponding halftone cell.

12. The method of claim 11, further comprising:
   outputting the threshold array halftoned color separation layer including each portion of the color separation layer that was threshold array halftoned based on the threshold values within the selected subrow of the corresponding halftone cell to an image forming device, the image forming device having a high-addressability direction and the low-addressability direction;
   operating the image forming device based on the threshold array halftoned color separation layer such that each portion of the color separation layer that was threshold array halftoned based on the threshold values within the selected subrow of the corresponding halftone cell is shifted by the determined shift amount in the low-addressability direction.

13. A method for shifting at least a portion of a color separation layer of a continuous tone image along a low-addressability direction, comprising:
   determining, for the portion of the color separation layer, a shift amount along a low-addressability direction;
   applying a threshold array halftone screen to the one color separation layer, the threshold array halftone screen comprising a plurality of halftone cells, each halftone cell comprising:
      a plurality of pixels arranged into at least one row of pixels, each pixel having a first dimension along a high-addressability direction and a second dimension along the low-addressability direction, and
      a plurality of high-addressability pixels defined in each of the plurality of pixels, each high-addressability pixel having a first dimension along the high-addressability direction and a second dimension along the low-addressability direction, where a ratio between the first and second dimensions of the plurality of high addressability pixels defines a high-addressability factor, wherein each high-addressability pixel is divided along the low-addressability direction to define a plurality of subcells of the pixels of the halftone cell, each subcell having a threshold value, the plurality of subcells of each of the at least one row of the halftone cell arranged into a plurality of subrows;
   selecting, for each of at least one of the at least one portion of the color separation layer for which a shift amount has been determined, one of the plurality of subrows of the halftone cell corresponding to that portion of the color separation layer based on the determined shift amount; and
   threshold array halftoning the portion of the color separation layer based on the threshold values within the selected subrow of the corresponding halftone cell to shift the portion of the color separation layer along the low-addressability direction.

14. The method of claim 13, further comprising:
   outputting the threshold array halftoned color separation layer including the portion of the color separation layer that was threshold array halftoned based on the threshold values within the selected subrow of the corresponding halftone cell to an image forming device, the image forming device having a high-addressability direction and the low-addressability direction;
   operating the image forming device based on the threshold array halftoned color separation layer such that the portion of the color separation layer that was threshold array halftoned based on the threshold values within the selected subrow of the corresponding halftone cell is shifted by the determined shift amount in the low-addressability direction.

15. A method for converting a continuous tone image into a threshold-array halftoned binary image, comprising:
   inputting the continuous tone image comprising at least one color separation layer;
   determining, for at least one portion of at least one of the color separation layer, a shift amount along a low-addressability direction;
   applying a threshold array halftone screen to each of the at least one color separation layer, the threshold array halftone screen comprising a plurality of halftone cells, each halftone cell comprising:
  a plurality of pixels arranged into at least one row of pixels, each pixel having a first dimension along a high-addressability direction and a second dimension along the low-addressability direction, and
  a plurality of high-addressability pixels defined in each of the plurality of pixels, each high-addressability pixel having a first dimension along the high-addressability direction and a second dimension along the low-addressability direction, where a ratio between the first and second dimensions of the plurality of high addressability pixels defines a high-addressability factor, wherein each high-addressability pixel is divided along the low-addressability direction to define a plurality of subcells of the pixels of the halftone cell, each subcell having a threshold value, the plurality of subcells of each of the at least one row of the halftone cell arranged into a plurality of subrows;
selecting, for each of at least one of the at least one color separation layer, for each of at least one of the at least one portion of that color separation layer for which a shift amount has been determined, one of the plurality of subrows of the halftone cell corresponding to that portion of that color separation layer based on the determined shift amount; and
threshold array halftoning that portion of that color separation layer based on the threshold values within the selected subrow of the corresponding halftone cell.

16. The method of claim 15, further comprising:
outputting the at least one halftoned color separation layer including the at least one portion of the at least one color separation layer that was threshold array halftoned based on the threshold values within the selected subrow of the corresponding halftone cell to an image forming device, the image forming device having a high-addressability direction and the low-addressability direction;
operating the image forming device based on the at least one threshold array halftoned color separation layer such that each at least one portion that was threshold array halftoned based on the threshold values within the selected subrow of the corresponding halftone cell is shifted by the determined shift amount in the low-addressability direction.

17. A method for printing a continuous tone image, comprising:
inputting the continuous tone image, the continuous tone image comprising at least one color separation layer;
generating a first threshold array halftoned color separation layer from a first one of the color separation layers of the continuous tone image;
controlling an image forming device based on the first threshold array halftoned color separation layer to form a first output image;
determining, for each of at least one portion of the first output image, a shift amount along a low-addressability direction for that portion;
applying a threshold array halftone screen to a second color separation layer of the continuous tone, the threshold array halftone screen comprising a plurality of halftone cells, each halftone cell comprising:
  a plurality of pixels arranged into at least one row of pixels, each pixel having a first dimension along a high-addressability direction and a second dimension along the low-addressability direction, and
  a plurality of high-addressability pixels defined in each of the plurality of pixels, each high-addressability pixel having a first dimension along the high-addressability direction and a second dimension along the low-addressability direction, where a ratio between the first and second dimensions of the plurality of high addressability pixels defines a high-addressability factor, wherein each high-addressability pixel is divided along the low-addressability direction to define a plurality of subcells of the pixels of the halftone cell, each subcell having a threshold value, the plurality of subcells of each of the at least one row of the halftone cell arranged into a plurality of subrows;
selecting, for each of at least one portion of the second color separation layer, each portion of the second color separation portion corresponding to a portion of the first output image for which a shift amount has been determined, one of the plurality of subrows of the halftone cell corresponding to that portion of the second color separation layer based on the determined shift amount;
threshold array halftoning the second color separation layer, wherein each portion of the second color separation layer corresponding to a portion of the first output image for which a shift amount has been determined is threshold array halftoned based on the threshold values within the selected subrow; and
controlling an image-forming device based on the threshold array halftoned second color separation layer to form a second output image.

* * * * *